(12) United States Patent
Zhou et al.

(10) Patent No.: US 11,374,486 B2
(45) Date of Patent: Jun. 28, 2022

(54) POWER SUPPLY WITH FLEXIBLE CONTROL AND THE METHOD THEREOF

(71) Applicant: Monolithic Power Systems, Inc., San Jose, CA (US)

(72) Inventors: Bo Zhou, Redmond, WA (US); Ming Lu, San Jose, CA (US); Pengjie Lai, San Jose, CA (US); Jian Jiang, Los Gatos, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 91 days.

(21) Appl. No.: 17/037,388

(22) Filed: Sep. 29, 2020

(65) Prior Publication Data

US 2022/0100253 A1    Mar. 31, 2022

(51) Int. Cl.
| | |
|---|---|
| H02M 1/36 | (2007.01) |
| G06F 1/32 | (2019.01) |
| G06F 1/3206 | (2019.01) |
| G06F 1/3237 | (2019.01) |

(52) U.S. Cl.
CPC ............ *H02M 1/36* (2013.01); *G06F 1/3206* (2013.01); *G06F 1/3237* (2013.01)

(58) Field of Classification Search
CPC .. H02M 1/36; G06F 1/26; G06F 1/263; G06F 1/28; G06F 1/30; G06F 1/3237; G06F 1/3206
See application file for complete search history.

(56) References Cited

U.S. PATENT DOCUMENTS

| | | | | |
|---|---|---|---|---|
| 6,879,139 | B2* | 4/2005 | Brown | H02M 3/33507 323/299 |
| 7,337,342 | B1* | 2/2008 | O'Brien | G06F 1/26 713/300 |
| 8,484,500 | B2* | 7/2013 | O'brien | G06F 1/26 713/340 |
| 8,493,044 | B2 | 7/2013 | Xu et al. | |
| 9,912,240 | B1 | 3/2018 | Nguyen et al. | |
| 2004/0220757 | A1* | 11/2004 | Weng | G06F 1/3203 702/60 |
| 2007/0050655 | A1* | 3/2007 | Heath | G06F 1/189 713/330 |
| 2008/0238655 | A1* | 10/2008 | McShane | G06F 1/32 340/538 |
| 2012/0049829 | A1* | 3/2012 | Murakami | H02M 1/32 327/333 |
| 2013/0265807 | A1* | 10/2013 | Lee | H02M 3/156 363/49 |
| 2015/0039916 | A1* | 2/2015 | Case | G06F 1/263 713/310 |
| 2017/0153680 | A1* | 6/2017 | Girard | G06F 1/3206 |
| 2018/0101219 | A1* | 4/2018 | Ross | G06F 1/3206 |

(Continued)

OTHER PUBLICATIONS

U.S. Appl. No. 16/711,394, filed Dec. 11, 2019, Chengdu Monolithic Power Systems.

*Primary Examiner* — Jaweed A Abbaszadeh
*Assistant Examiner* — Cheri L Harrington
(74) *Attorney, Agent, or Firm* — Perkins Coie LLP

(57) ABSTRACT

A power supply having at least one PMIC provides flexible control to the power manage systems. The PMIC has an enable pin configured to receive a control signal, and a clock pin configured to generate and/or receive a series of clock pulses, so as to facilitate the operation of the PMIC.

10 Claims, 7 Drawing Sheets

(56) References Cited

U.S. PATENT DOCUMENTS

| | | | |
|---|---|---|---|
| 2019/0064910 A1* | 2/2019 | Wang | G06F 1/3206 |
| 2019/0317911 A1* | 10/2019 | Chun | G06F 13/36 |
| 2021/0081286 A1* | 3/2021 | Lambert | G06F 13/4282 |
| 2021/0208658 A1* | 7/2021 | Sato | H02M 3/156 |
| 2021/0271276 A1* | 9/2021 | Seok | G06F 1/26 |

* cited by examiner

US 11,374,486 B2

1

POWER SUPPLY WITH FLEXIBLE CONTROL AND THE METHOD THEREOF

FIELD

The present invention relates to electronic circuits, more specifically, the present invention relates to power supply with flexible control and the method thereof.

BACKGROUND

Power management systems typically comprise a DC-DC converter converting an input voltage to an output voltage, which is higher than the input voltage in the case of a boost converter or lower than the input voltage in the case of a buck converter. Several DC-DC converters may be employed together to form a multi-rail power supply, with each DC-DC converter providing different output voltages or different output currents to power different loads. When multiple power management Integrated circuits (PMICs) are used in one power supply system, prior art uses chained system connection control scheme to control different power rails. However, the chained system connection control scheme cannot synchronize different power rails. Moreover, it is not flexible enough to cover different application requirements.

SUMMARY

It is an object of the present invention to provide an improved power supply, which solves the above problems.

In accomplishing the above and other objects, there has been provided, in accordance with an embodiment of the present invention, a power supply, comprising: a master PMIC, having: at least one power rail configured to generate an output voltage based on an input voltage; an enable pin configured to receive a control signal; and a clock pin, configured to output a series of clock pulses during a power on process and during a power off process; wherein the power rail is configured to count a number of the clock pulses during the power on process and during the power off process: when a counted number of the clock pulses reaches a set on number during the power on process, the corresponding power rail is turned on; and when the counted number of the clock pulses reaches a set off number during the power off process, the corresponding power rail is turned off.

In addition, there has been provided, in accordance with an embodiment of the present invention, a power supply, comprising: a master PMIC and n slave PMICs, wherein n is an integer equal to or greater than one, each of the master PMIC and the slave PMIC including: at least one power rail, configure to generate an output voltage based on an input voltage; an enable pin, configured to receive a control signal; and a clock pin, wherein the enable pins of all of the PMICs are coupled together, and the clock pins of all of the PMICs are coupled together.

Furthermore, there has been provided, in accordance with an embodiment of the present invention, a method used in a power supply, the power supply comprising a master PMIC and n slave PMICs, wherein n is an integer equal to or greater than one, each PMIC rail being configured to receive an input voltage, and each PMIC including at least a power rail, an enable pin and a clock pin, the method comprising: coupling the enable pins of all of the PMICs together, and coupling the clock pins of all the PMICs together; comparing voltages at all of the enable pins with a rising voltage

2 threshold and a falling voltage threshold, and comparing input voltages of all of the PMICs with an under voltage threshold; generating a series of clock on pulses to start a power on sequence when a) the voltages at all of the enable pins reach the rising voltage threshold and b) the input voltages of all of the PMICs are higher than the under voltage threshold; and generate a series of clock off pulses to start a power off sequence when the voltages at all of the enable pins fall to the falling voltage threshold.

The use of the similar reference label in different drawings indicates the same of like components.

DETAILED DESCRIPTION

Embodiments of circuits for power supply are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
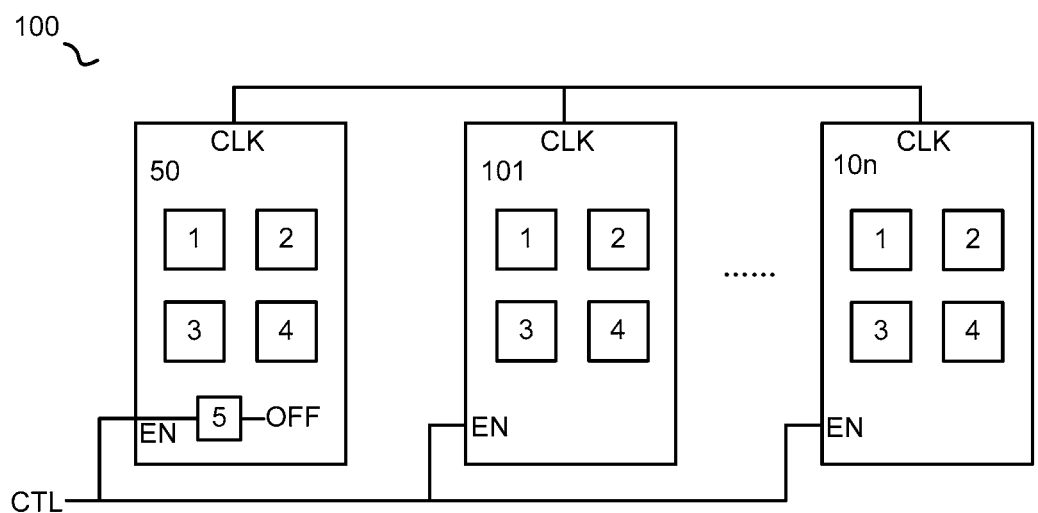
FIG. 1 schematically shows a power supply 100 with multiple PMICs (power management integrated circuits) in accordance with an embodiment of the present invention.

FIG. 1 schematically shows a power supply 100 with multiple PMICs (power management integrated circuits) in accordance with an embodiment of the present invention. In the embodiment of FIG. 1, the power supply 100 comprises: a master PMIC 50 and n slave PMICs (e.g., 101, ... 10n as shown in FIG. 1), wherein n is an integer equal to or greater than one (e.g. n=1, 2, 3 ... ), each PMIC having: at least one power rail (e.g. FIG. 1 shows that each PMIC has four power rails 1, 2, 3, and 4) configured to generate an output voltage based on an input voltage, an enable pin EN configured to receive a control signal CTL, and a clock pin CLK, wherein the enable pins of all of the PMICs are coupled together, and the clock pins of all of the PMICs are coupled together.

In one embodiment of the present invention, each of the power rails is configured to receive the same input voltage, and to generate a different output voltage.

In one embodiment of the present invention, the master PMIC 50 is configured to generate a series of clock pulses at the clock pin CLK during a power on process and during a power off process; and the slave PMICs are configured to receive the clock pulses at the clock pin CLK. In one embodiment of the present invention, the power rails both in the master PMIC and in the slave PMIC are configured to count a number of the clock pulses during the power on process and during the power off process. When a counted number of the clock pulses reaches a set on number during the power on process, the corresponding power rail is turned on; and when the counted number of the clock pulses reaches a set off number, the corresponding power rail is turned off.

Figure 2:
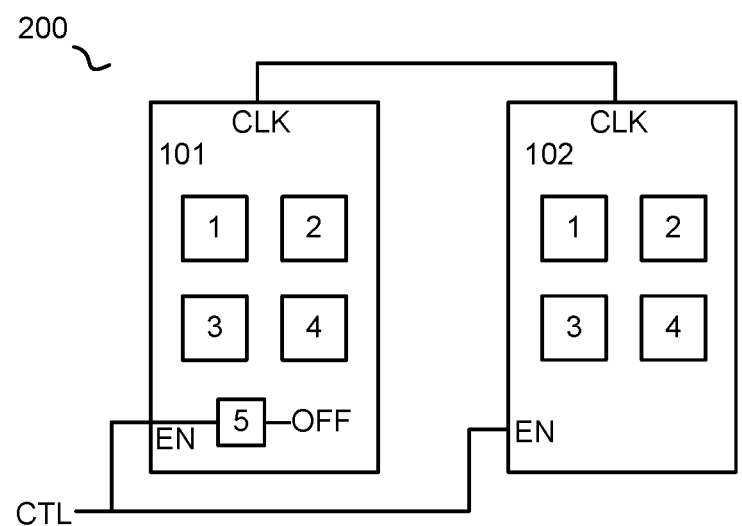
FIG. 2 schematically shows a power supply 200 when n=1 (i.e., when the power supply comprises a master PMIC and a slave PMIC) in accordance with an embodiment of the present invention.

FIG. 2 schematically shows a power supply 200 when n=1 (i.e., when the power supply comprises one master PMIC and one slave PMIC) in accordance with an embodiment of the present invention.

Figure 3:
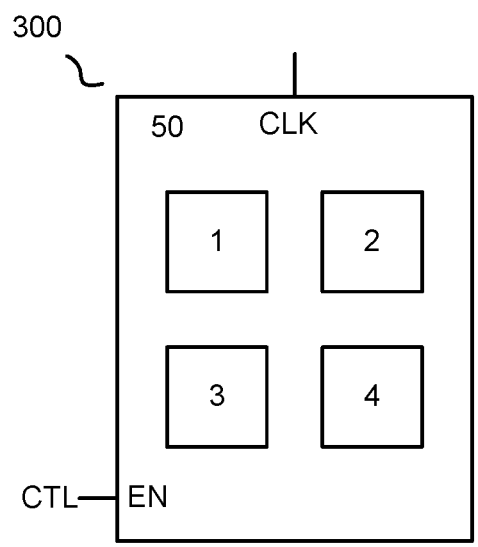
FIG. 3 schematically shows a power supply 300 with only one PMIC in accordance with an embodiment of the present invention.

In one embodiment of the present invention, the power supply may comprise only one PMIC 50, no slave PMIC is included, as shown in FIG. 3. Specifically, in the embodiment shown in FIG. 3, the power supply 300 comprises: a master PMIC 50, having: at least one power rail (e.g., power rails 1, 2, 3, 4 as shown in FIG. 3), configured to generate an output voltage based on an input voltage; an enable pin EN, configured to receive a control signal CTL; and a clock pin CLK, configured to output a series of clock pulses during a power on process and during a power off process; wherein the power rail is configured to counter a number of the clock pulses during the power on process and during the power off process: when the counted number of the clock pulses reaches a set on number, the corresponding power rail is turned on; and when the counted number of the clock pulses reaches a set off number, the corresponding power rail is turned off, to convert the input voltage to the output voltage.

In one embodiment of the present invention, each PMIC is configured to compare a voltage signal indicative of a voltage at the enable pin EN (i.e. the control signal CTL) with a rising voltage threshold. In addition, each PMIC is configured to compare its input voltage with an under voltage threshold. When all of the input voltages reach the under voltage threshold, and the voltage signal indicative of the voltage at the enable pin is greater than the rising voltage threshold, the master PMIC 50 starts to generate the clock pulses to start a power on sequence. Meanwhile, the power rails both in the master PMIC and in the slave PMIC start to count the number of the clock pulses. When the counted number of clock pulses reaches the set on number, the corresponding power rail is turned on. If the voltage signal indicative of the voltage at the enable pin is over the rising voltage threshold, but the input voltage has not reached the under voltage threshold, the corresponding PMIC (either the master PMIC or the slave PMIC) would pull the voltage at its enable pin low, and the power on sequence cannot be started. Therefore, only when all the PMICs have the input voltage ready, the enable pin is allowed to pull high to start the power on sequence. In addition, if any one PMIC does not receive the control signal CTL at the enable pin EN, the corresponding PMIC would pull low the clock pin CLK, so that no power on sequence is generated.

Figure 4A:
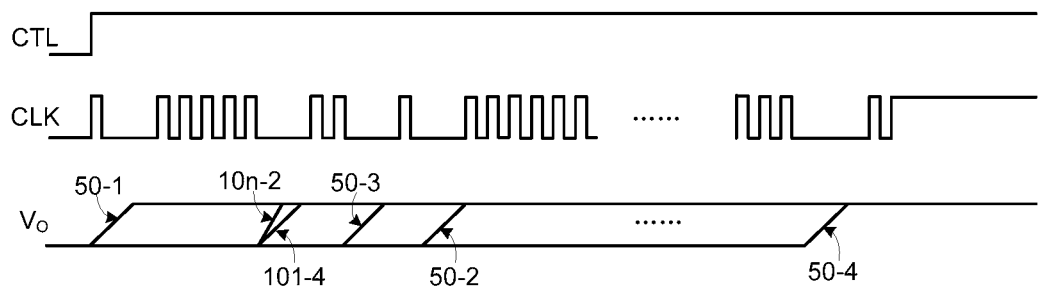
FIG. 4A schematically shows timing waveforms of the control signal CTL (i.e. the voltage at the enable pin EN), the clock pulses generated at the clock pin CLK, and the output voltages of different power rails in different PMICs when the sequence pause occurs during the power on process in accordance with an embodiment of the present invention.

During the power on process of a specific power rail, in one embodiment of the present invention, the corresponding power rail may pull the clock pin of the corresponding PMIC low, until the power on process is completed. The master PMIC 50 monitors the status of the clock pin. If the clock pin is pulled low by any one of the PMICs, the clock pulses are paused (i.e., the power on sequence is paused). Consequently, the other PMICs and/or the other power rails have to wait for this power rail to finish the soft start. Until the clock pin is released, the master PMIC resumes the clock pulse output. The corresponding timing waveforms of the control signal CTL (i.e. the voltage at the enable pin EN), the clock pulses generated at the clock pin CLK, and the output voltages of different power rails in different PMICs are shown in FIG. 4A. In the example of FIG. 4A, 50-1 represents power rail 1 in the master PMIC 50, 10n-2 represents power rail 2 in PMIC 10n (wherein n is an integer), 101-4 represents power rail 4 in PMIC 101, 50-3 represents power rail 3 in PMIC 50, 50-2 represents power rail 2 in PMIC 50, and 50-4 represents power rail 4 in PMIC 50. As shown in FIG. 4A, the clock pulses are paused when any one of the power rails (e.g. 50-1, 10n-2, 101-4, 50-3, 50-2, ... , 50-4) is at the power on process.

Figure 4B:
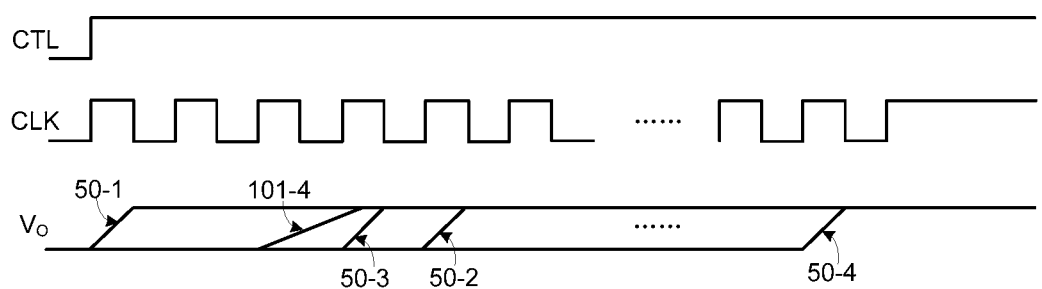
FIG. 4B schematically shows timing waveforms of the control signal CTL (i.e. the voltage at the enable pin EN), the clock pulses generated at the clock pin CLK, and the output voltages of different power rails in different PMICs when no sequence pause occurs during the power on process in accordance with an embodiment of the present invention.

In other embodiments of the present invention, during the power on process of a specific power rail, the corresponding power rail may not pull the clock pin low. The master PMIC continues to generate the clock pulses without pause. The corresponding timing waveforms of the control signal CTL (i.e. the voltage at the enable pin EN), the clock pulses generated at the clock pin CLK, and the output voltages of different power rails in different PMICs are shown in FIG. 4B. As shown in FIG. 4B, the clock pulses are not paused when either one of the power rails (e.g. 50-1, 101-4, 50-3, 50-2, ... , 50-4) is at the power on process.

In one embodiment of the present invention, when the number of the clock pulses generated by the master PMIC 50 reaches a total on number, the master PMIC 50 stops the clock pulse output, and the power on sequence is completed.

In one embodiment of the present invention, the rising voltage threshold of the master PMIC is higher than the rising voltage threshold of the slave PMIC, to insure that the master PMIC is the last PMIC to be enabled. In other embodiments of the present invention, the rising voltage threshold of the master PMIC may be equal to the rising voltage threshold of the slave PMIC, but the master PMIC derives a voltage signal having a lower voltage ratio to the voltage at the enable pin EN than that of the slave PMIC, so that when the voltage signal at the master PMIC reaches the rising voltage threshold, the voltage signal at the slave PMIC has already reaches the rising voltage threshold, to insure that the master PMIC is the last PMIC to be enabled.

In one embodiment of the present invention, all of the slave PMICs may have a same rising voltage threshold.

In one embodiment of the present invention, each PMIC is configured to compare the voltage signal indicative of the voltage at the enable pin EN with a falling voltage threshold. When the voltage signal indicative of the voltage at the enable pin EN is beneath the falling voltage threshold, the master PMIC 50 starts to generate the clock pulses to start a power off sequence. Meanwhile, the power rails both in the master PMIC and in the slave PMIC start to count the number of the clock pulses. When the counted number of the clock pulses reaches the set off number, the corresponding power rail is turned off.

Figure 5A:
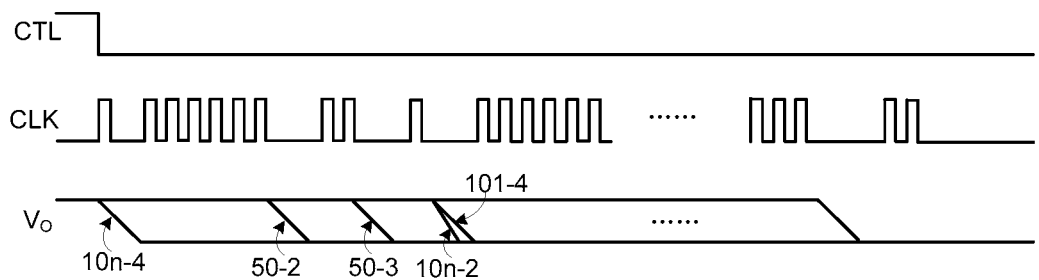
FIG. 5A schematically shows timing waveforms of the control signal CTL (i.e. the voltage at the enable pin EN), the clock pulses generated at the clock pin CLK, and the output voltages of different power rails in different PMICs when the sequence pause occurs during the power off process in accordance with an embodiment of the present invention.

During the power off process of a specific power rail, in one embodiment of the present invention, the corresponding power rail may pull the clock pin of the corresponding PMIC low, until the power off process is completed. The master PMIC monitors the status of the clock pin. If the clock pin is pulled low by any one of the PMICs, the clock pulses are paused (i.e. the power off sequence is paused). Consequently, the other PMICs and/or the other power rails have to wait for this power rail to finish the soft stop. Until the clock pin is released, the master PMIC resumes the clock pulse output. The corresponding timing waveforms of the control signal CTL (i.e. the voltage at the enable pin EN), the clock pulses generated at the clock pin CLK, and the output voltages of different power rails in different PMICs are shown in FIG. 5A. As shown in FIG. 5A, the clock pulses are paused when any one of the power rails (e.g. 10*n*-4, 50-2, 50-3, 10*n*-2, . . . , 101-4,) is at the power off process.

Figure 5B:
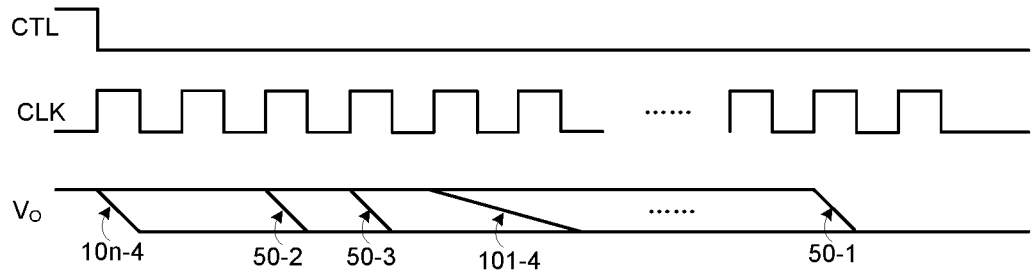
FIG. 5B schematically shows timing waveforms of the control signal CTL (i.e. the voltage at the enable pin EN), the clock pulses generated at the clock pin CLK, and the output voltages of different power rails in different PMICs when the sequence pause does not occur during the power off process in accordance with an embodiment of the present invention.

In other embodiments of the present invention, during the power off process of a specific power rail, the corresponding power rail may not pull the clock pin low. The master PMIC continues to generate the clock pulses without pause. The corresponding timing waveforms of the control signal CTL (i.e. the voltage at the enable pin EN), the clock pulses generated at the clock pin CLK, and the output voltages of different power rails in different PMICs are shown in FIG. 5B. As shown in FIG. 5B, the clock pulses are not paused when either one of the power rails (e.g. 10*n*-4, 50-2, 50-3, 101-4, . . . , 50-1) is at the power on process.

In one embodiment of the present invention, the master PMIC 50 may receive an OFF command. When the master PMIC receives the OFF command, it pulls the enable pin low to synchronize other PMICs (e.g., via a pull-low circuit 5 as shown in FIG. 1). Then after a set short time period (e.g., 100 us), the master PMIC releases the enable pin and starts the clock pulse output.

In one embodiment of the present invention, when the number of the clock pulses generated by the master PMIC 50 reaches a total off number, the master PMIC 50 stops the clock pulse output, and the power off sequence is completed.

In one embodiment of the present invention, the set on number may be equal to the set off number. In one embodiment of the present invention, the total on number may be equal to the total off number.

In one embodiment of the present invention, the falling voltage threshold of the master PMIC may be lower than the falling voltage threshold of the slave PMIC, to insure that the master PMIC is the last PMIC to be disabled. In other embodiments of the present invention, the falling voltage threshold of the master PMIC may be equal to the falling voltage threshold of the slave PMIC, but the master PMIC derives a voltage signal having a higher voltage ratio to the voltage at the enable pin EN than that of the slave PMIC, so that when the voltage signal at the master PMIC falls to the falling voltage threshold, the voltage signal at the slave PMIC has already falls to the falling voltage threshold, to insure that the master PMIC is the last PMIC to be disabled.

In one embodiment of the present invention, all of the slave PMICs may have a same falling voltage threshold.

In one embodiment of the present invention, if any error happens to one power rail during the power on process and/or during the power off process (i.e., during soft start and/or during soft stop), other power rails may hold and the power sequence is paused, to wait for the host to take action. In other embodiments of the present invention, if any error happens to one power rail during the power on process and/or during the power off process, other power rails may ignore the error rail and keep the power on sequence and/or the power off sequence. The error is reported to the host.

In one embodiment of the present invention, if any error happens to one power rail at any of the PMICs, the corresponding PMIC may pull low the enable pin EN to shut down the whole system. When the error is cleared (e.g. by the host), the enable pin EN would be released. If the control signal CTL is high after the release of the enable pin, the system would get restart.

Figure 6:
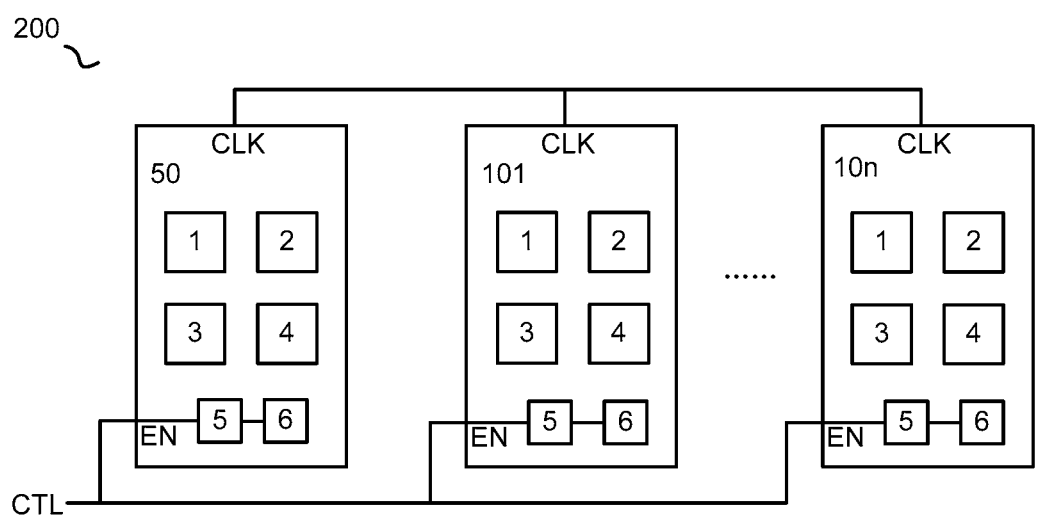
FIG. 6 schematically shows a power supply 600 with multiple PMICs in accordance with an embodiment of the present invention.

FIG. 6 schematically shows a power supply 600 with multiple PMICs in accordance with an embodiment of the present invention. The power supply 600 in FIG. 6 is similar to the power supply 100 in FIG. 1, with a difference that the master PMIC and each of the slave PMICs in the power supply 600 further include a fault detector 6, which is configured to detect a fault condition in the corresponding PMIC, to actively pull the enable pin low if the fault condition is detected via a pull-low circuit 5, until the fault condition is cleared.

That is, when an error happens to one power rail, the enable pin EN is pulled low to shut down the whole system. With such global shut down option, the PMIC with the error rail pulls down the enable pin EN to start the power OFF sequence. Accordingly, all the other rails are turned OFF per the sequence. The enable pin EN is kept down by the error PMIC as long as the fault status is present. When the host successfully clears the fault status, it sends a clear command. Then the enable pin EN is released; and the host may send a high control signal CTL to restart the power ON sequence.

Figure 7:
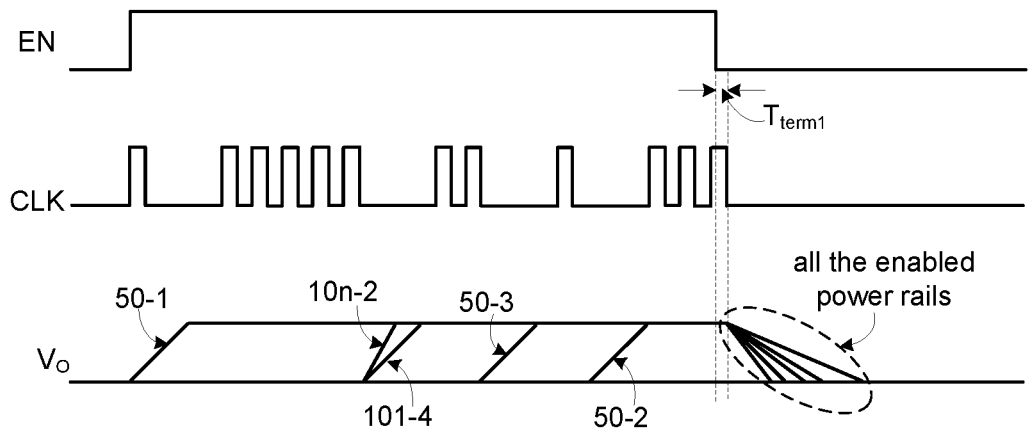
FIG. 7 schematically shows timing waveforms of the voltage at the enable pin EN, the clock pulses and the output voltages of different power rails at different PMICs when termination occurs during the power on process in accordance with an embodiment of the present invention.

During the power on process of the power supply, if the enable pin EN is pulled low for a first set time period $T_{term1}$, the power on sequence is terminated, and all of the enabled power rails are turned off at the same time, following the internal soft-stop time setting, as shown in FIG. 7.

Figure 8:
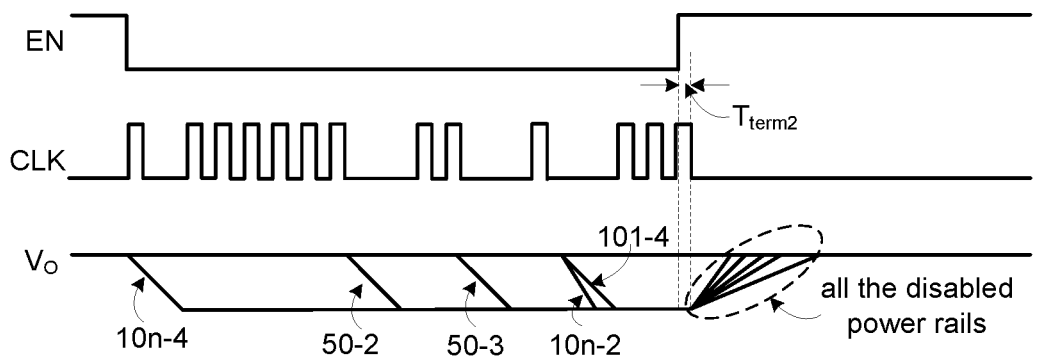
FIG. 8 schematically shows timing waveforms of the voltage at the enable pin EN, the clock pulses and the output voltages of different power rails at different PMICs when termination occurs during the power off process in accordance with an embodiment of the present invention.

During the power off process of the power supply, if the EN pin is pulled high for a second set time period $T_{term2}$, the power off sequence is terminated, and all of the disabled power rails are turned on at the same time following the internal soft-start time setting, as shown in FIG. 8.

In one embodiment of the present invention, the first set time period $T_{term1}$ may be equal to the second set time period $T_{term2}$.

For each PMIC, either when the voltage at the enable pin EN is below the rising voltage threshold, or when the input voltage is below the under voltage threshold, the CLK pin is pulled low by the corresponding PMIC. In this case, if any slave PMIC is not ready for the power off sequence to start, the master PMIC detects this condition and wait for the slave PMIC to get ready. For the master PMIC, when the voltage at the enable pin EN falls lower than the falling voltage threshold, the master PMIC actively pulls the EN pin low for the set short time period. In this case, all the slave PMICs are notified the start of the power off sequence.

Figure 9:
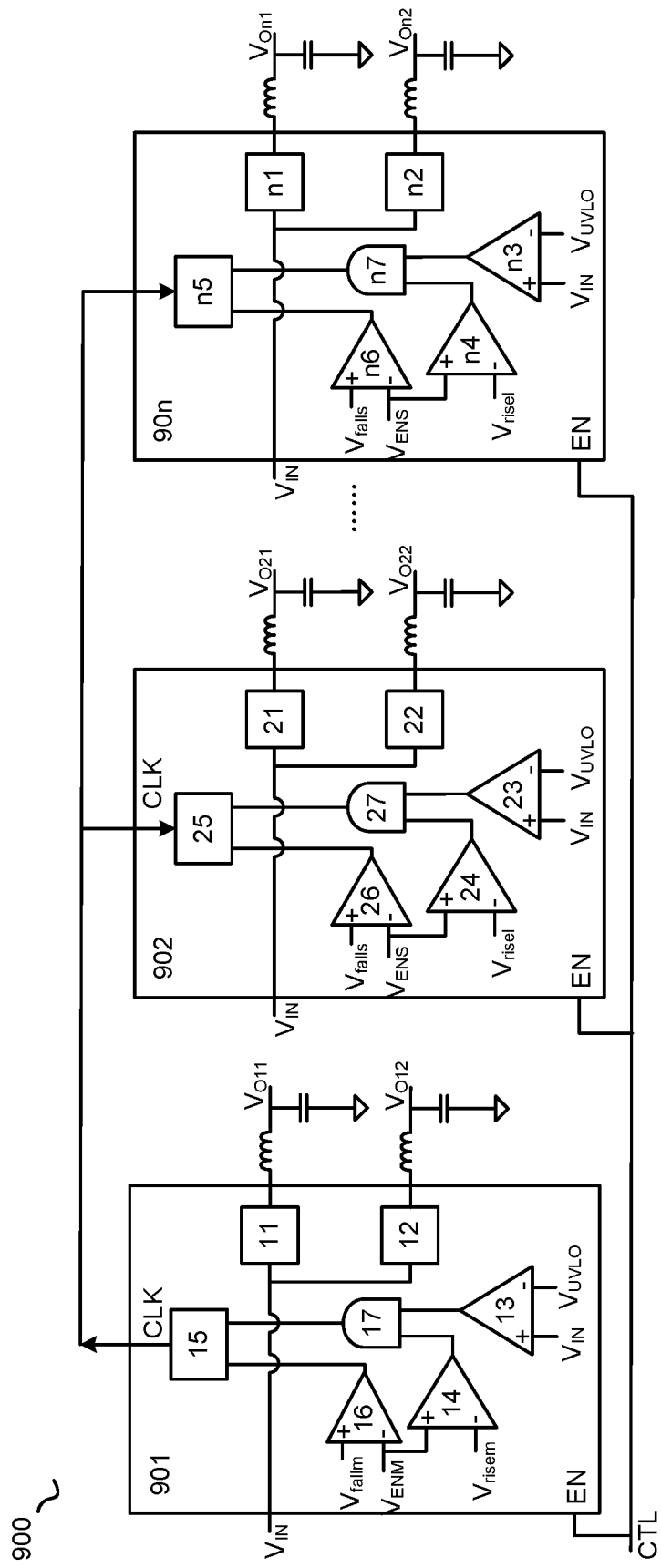
FIG. 9 schematically shows a power supply 900 with circuit configuration in accordance with an embodiment of the present invention.

FIG. 9 schematically shows a power supply 900 with circuit configuration in accordance with an embodiment of the present invention. In the example of FIG. 9, the power supply 900 comprises: a master PMIC 901, including: an enable pin EN configured to receive a control signal CTL, a clock pin CLK configured to output a series of clock pulses; at least one power rail, configure to generate an output voltage based on an input voltage (e.g., a first power rail 11, configured to generate a first output voltage $V_{O11}$ based on an input voltage $V_{IN}$; and a second power rail 12, configured to generate a second output voltage $V_{O12}$ based on the input voltage $V_{IN}$); a UVLO comparator 13, configured to compare the input voltage $V_{IN}$ with an under voltage threshold $V_{UVLO}$; a rising comparator 14, configured to compare a master enable voltage $V_{ENM}$ indicative of a voltage at the enable pin with a master rising voltage threshold $V_{risem}$; a clock generator 15, configured to generate the clock pulses in response to the comparison results of the UVLO comparator 13 and the rising comparator 14, wherein when the input voltage $V_{IN}$ reaches (or is higher than) the under voltage threshold $V_{UVLO}$ and the master enable voltage $V_{ENM}$ reaches (or is higher than) the master rising voltage threshold $V_{risem}$, the clock generator 15 is configured to output the clock pulses to start the power on sequence.

In one embodiment of the present invention, the master PMIC 901 further comprises: a falling comparator 16, configured to compare the master enable voltage $V_{ENM}$ with a master falling voltage threshold $V_{fallm}$; wherein when the master enable voltage $V_{ENM}$ falls to (or is lower than) the master falling voltage threshold $V_{fallm}$, the clock generator 15 is configured to output the clock pulse to start the power off sequence.

In one embodiment of the present invention, the master PMIC 901 may receive an OFF command (e.g. from a host, not shown) or a fault condition detection through a fault detector. It will pull the enable pin low to synchronize all PMICs (e.g. via the pull-low circuit 5 as shown in FIG. 1 & FIG. 6). Then after a set short time period (e.g., 100 us), the master PMIC 901 releases the enable pin EN and starts the clock pulses output.

In one embodiment of the present invention, the master PMIC 901 further comprises: a logic AND circuit 17, configured to execute logical AND operation on the comparison results of the UVLO comparator 13 and the rising comparator 14, and to provide the operation result to the clock generator 15.

In one embodiment of the present invention, when the input voltage $V_{IN}$ reaches (or is higher than) the under voltage threshold $V_{UVLO}$ and the master enable voltage $V_{ENM}$ reaches (or is higher than) the master rising voltage threshold $V_{risem}$, the clock generator 15 starts to output the clock pulses to start the power on sequence, and when the master enable voltage $V_{ENM}$ falls to (or is lower than) the master falling voltage threshold $V_{fallm}$, the clock generator 15 starts to output the clock pulses to start the power off sequence.

In one embodiment of the present invention, the power supply 900 further comprises at least one slave PMIC (e.g. 902, 90n as shown in FIG. 9, wherein n is an integer greater than 1), each slave PMIC having the enable pin EN, the clock pin CLK, at least one power rail, configure to generate an output voltage based on an input voltage (e.g., a first power rail 21 (n1), configured to generate a first output voltage $V_{O21}$ ($V_{On1}$) based on an input voltage $V_{IN}$; and a second power rail 22 (n2), configured to generate a second output voltage $V_{O22}$ ($V_{On2}$) based on the input voltage $V_{IN}$), the UVLO comparator (e.g. 23, n3), the rising comparator (e.g. 24, n4), the falling comparator (e.g. 26, n6) and the logical AND circuit (e.g. 27, n7) as the master PMIC 901. Different to the master PMIC 901, each slave PMIC does not have the clock generator. Instead, each slave PMIC includes a clock processor (e.g. 25, n5), configured to count the number of the clock pulses during the power on and the power off processes, and to pull low the clock pin of the corresponding slave PMIC if a certain power rail in the corresponding slave PMIC is under the power on progress and/or the power off progress.

In one embodiment of the present invention, the rising comparator (e.g. 24, n4) in the slave PMIC is configured to compare a slave enable voltage $V_{ENS}$ indicative of the voltage at the enable pin EN with a slave rising voltage threshold $V_{risel}$. The slave PMIC is operable to pull low the clock pin either when the slave enable voltage $V_{ENS}$ falls to (or is lower than) the slave rising voltage threshold $V_{risel}$ or when the input voltage $V_{IN}$ falls to (or is lower than) the under voltage threshold $V_{UVLO}$. In one embodiment of the present invention, the slave enable voltage $V_{ENS}$ may be equal to the master enable voltage $V_{ENM}$, and the slave rising voltage threshold $V_{risel}$ may be lower than the master rising voltage threshold $V_{risem}$. In other embodiments of the present invention, the slave rising voltage threshold $V_{risel}$ may be equal to the master rising voltage threshold $V_{risem}$, and the slave enable voltage $V_{ENS}$ may be higher than the master enable voltage $V_{ENM}$ (e.g., the slave enable voltage $V_{ENS}$ may have a higher voltage ratio to the voltage at the enable pin than that of the master enable voltage $V_{ENM}$).

In one embodiment of the present invention, the falling comparator (e.g. 25, n5) in the slave PMIC is configured to compare the slave enable voltage $V_{ENS}$ with a slave falling voltage threshold $V_{falls}$. In one embodiment of the present invention, the slave falling voltage threshold $V_{falls}$ may be higher than the master falling voltage threshold $V_{fallm}$, and the slave rising voltage threshold $V_{risel}$ may be lower than the master rising voltage threshold $V_{risem}$. In other embodiments of the present invention, the slave falling voltage threshold $V_{falls}$ may be equal to the master falling voltage threshold $V_{fallm}$, and the slave enable voltage $V_{ENS}$ may be lower than the master enable voltage $V_{ENM}$ (e.g., the slave enable voltage $V_{ENS}$ may have a lower voltage ratio to the voltage at the enable pin than that of the master enable voltage $V_{ENM}$).

Figure 10:
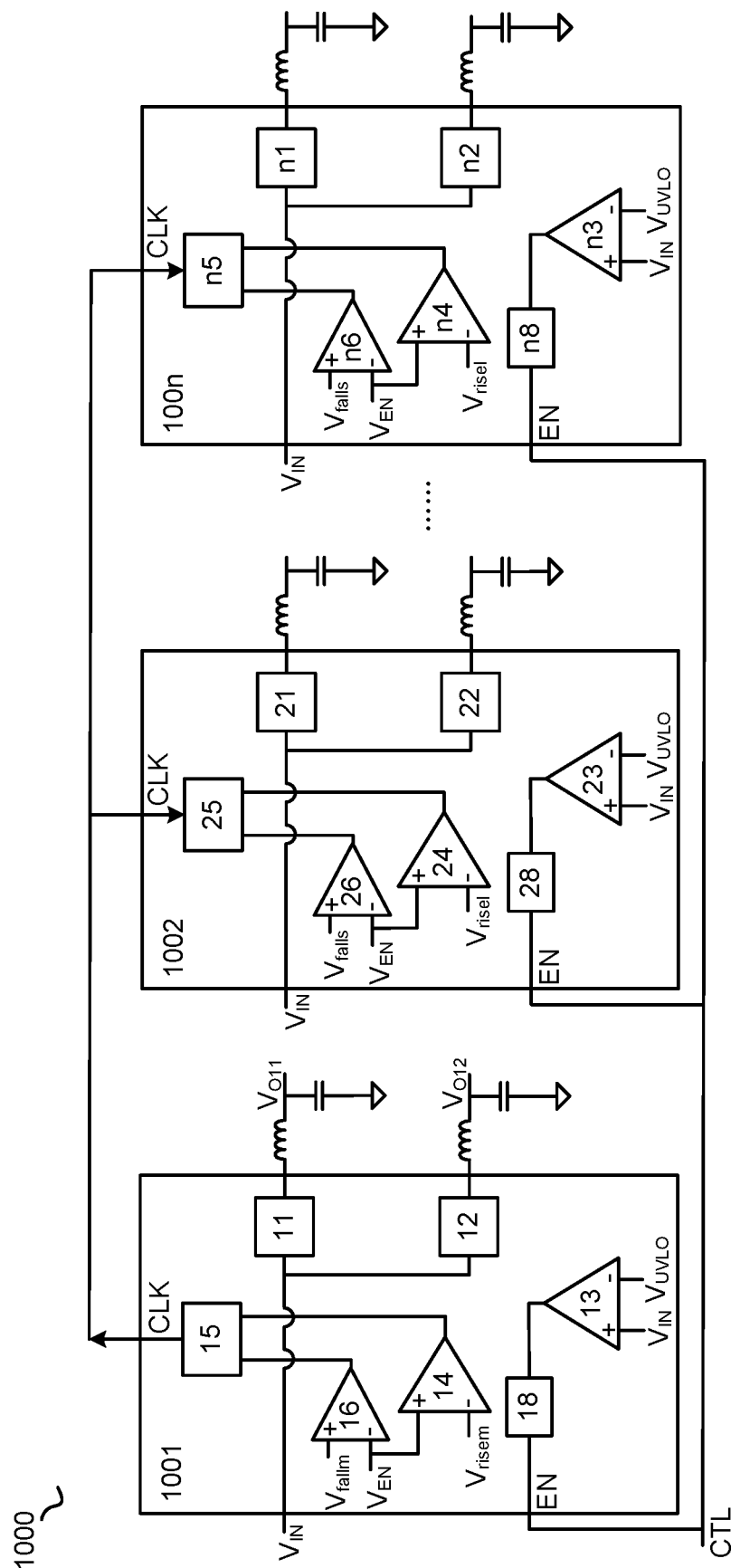
FIG. 10 schematically shows a power supply 1000 with circuit configuration in accordance with an embodiment of the present invention.

FIG. 10 schematically shows a power supply 1000 with circuit configuration in accordance with an embodiment of the present invention. In the example of FIG. 10, the power supply 1000 comprises: a master PMIC 1001, including: an enable pin EN configured to receive a control signal CTL, a clock pin CLK configured to output a series of clock pulses; at least one power rail, configure to generate an output voltage based on an input voltage (e.g., a first power rail 11, configured to generate a first output voltage $V_{O11}$ based on an input voltage $V_{IN}$; and a second power rail 12, configured to generate a second output voltage $V_{O12}$ based on the input voltage $V_{IN}$); a UVLO comparator 13, configured to compare the input voltage $V_{IN}$ with an under voltage threshold $V_{UVLO}$, wherein when the input voltage $V_{IN}$ falls to (or is lower than) the under voltage threshold $V_{UVLO}$, the enable pin EN is pulled low; a rising comparator 14, configured to compare a master enable voltage $V_{ENM}$ indicative of a voltage at the enable pin with a master rising voltage threshold $V_{risem}$; a clock generator 15, configured to generate the clock pulses to start the power on sequence when the master enable voltage $V_{ENM}$ is higher than the master rising voltage threshold $V_{risem}$; a falling comparator 16, configured to compare the master enable voltage $V_{ENM}$ with a master falling voltage threshold $V_{fallm}$; wherein when the master enable voltage $V_{ENM}$ falls to (or is lower) than the master falling voltage threshold $V_{fallm}$, the clock generator 15 is configured to output the clock pulses to start the power off sequence.

In one embodiment of the present invention, the master PMIC 1001 further comprises: a pull-low circuit 18, wherein the enable pin EN is pulled low by way of the pull-low circuit 18 when the input voltage $V_{IN}$ is lower than the under voltage threshold $V_{UVLO}$.

In the embodiment of FIG. 10, the power supply 1000 further comprises: at least one slave PMIC (e.g. 1002, 100n as shown in FIG. 10, wherein n is an integer greater than 1), each slave PMIC having the enable pin EN, the clock pin CLK, the first power rail (e.g. 21, n1), the second power rail (e.g. 22, n2), the UVLO comparator (e.g. 23, n3), the rising comparator (e.g. 24, n4), the falling comparator (e.g. 26, n6), and the pull-low circuit (e.g. 28, n8) as the master PMIC 1001. Different to the master PMIC 1001, each slave PMIC does not have the clock generator. Instead, each slave PMIC includes a clock processor (e.g. 25, n5), configured to count the number of the clock pulses during the power on and the power off processes, and to pull low the clock pin of the corresponding slave PMIC if a certain power rail in the corresponding slave PMIC is under the power on progress and/or the power off progress.

In the examples of FIG. 9 and FIG. 10, two power rails are illustrated in one PMIC (either in the master PMIC or in the salve PMIC). However, one skilled in the art should realize that the PMICs may include any desired number of power rails, and different PMICs may include different numbers of power rails, which is dependent on actual applications. For example, one PMIC may comprise one power rail, or may comprise more than two power rails.

In one embodiment of the present invention, the rising comparator (e.g. 24, n4) in the slave PMIC is configured to compare a slave enable voltage $V_{ENS}$ indicative of the voltage at the enable pin EN with a slave rising voltage threshold $V_{risel}$. In one embodiment of the present invention, the slave enable voltage $V_{ENS}$ may be equal to the master enable voltage $V_{ENM}$, and the slave rising voltage threshold $V_{risel}$ may be lower than the master rising voltage threshold $V_{risem}$. In other embodiments of the present invention, the slave rising voltage threshold $V_{risel}$ may be equal to the master rising voltage threshold $V_{risem}$, and the slave enable voltage $V_{ENS}$ may be higher than the master enable voltage $V_{ENM}$ (e.g., the slave enable voltage $V_{ENS}$ may have a higher voltage ratio to the voltage at the enable pin than that of the master enable voltage $V_{ENM}$).

In one embodiment of the present invention, the falling comparator (e.g. 25, n5) in the slave PMIC is configured to compare the slave enable voltage $V_{ENS}$ with a slave falling voltage threshold $V_{falls}$. In one embodiment of the present invention, the slave falling voltage threshold $V_{falls}$ may be higher than the master falling voltage threshold $V_{fallm}$, and the slave rising voltage threshold $V_{risel}$ may be lower than the master rising voltage threshold $V_{risem}$. In other embodiments of the present invention, the slave falling voltage threshold $V_{falls}$ may be equal to the master falling voltage threshold $V_{fallm}$, and the slave enable voltage $V_{ENS}$ may be lower than the master enable voltage $V_{ENM}$ (e.g., the slave enable voltage $V_{ENS}$ may have a lower voltage ratio to the voltage at the enable pin than that of the master enable voltage $V_{ENM}$).

Figure 11:
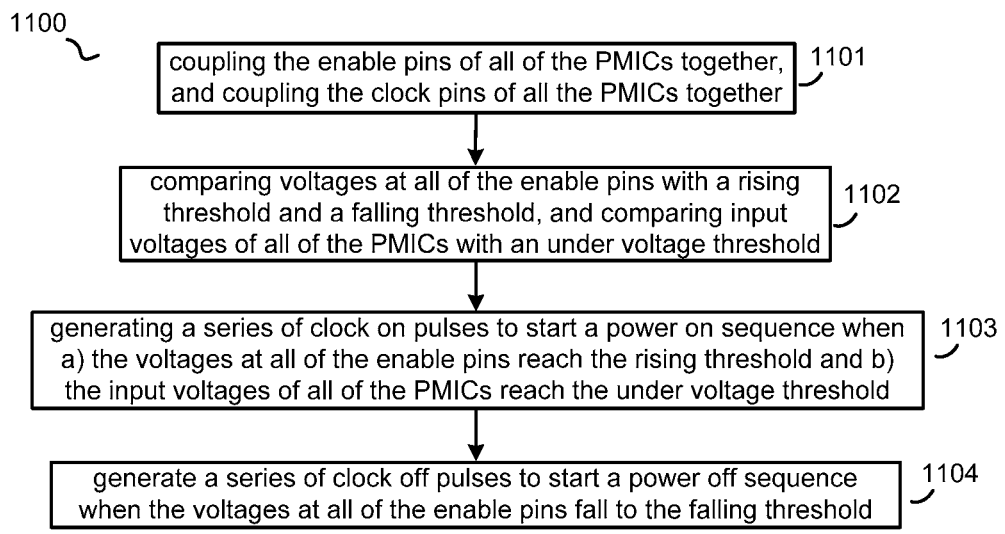
FIG. 11 schematically shows a flowchart 1100 of a method used in a power supply in accordance with an embodiment of the present invention.

FIG. 11 schematically shows a flowchart 1100 of a method used in a power supply in accordance with an embodiment of the present invention. The power supply comprises a master PMIC, and n slave PMICs, wherein n is an integer equal to or greater than one (i.e., n=1, 2 . . . ), each PMIC including at least a power rail, an enable pin and a clock pin. The method comprising:

Step 1101, coupling the enable pins of all of the PMICs together, and coupling the clock pins of all the PMICs together.

Step 1102, comparing voltages at all of the enable pins with a rising voltage threshold and a falling voltage threshold, and comparing input voltages of all of the PMICs with an under voltage threshold.

Step 1103, generating a series of clock on pulses to start a power on sequence when a) the voltages at all of the enable pins reach (or are higher than) the rising voltage threshold and b) the input voltages of all of the PMICs reach (or are higher than) the under voltage threshold. And Step 1104, generate a series of clock off pulses to start a power off sequence when the voltages at all of the enable pins fall to (or are lower than) the falling voltage threshold.

In one embodiment of the present invention, the method further comprises: counting a number of the clock on pulses, when the counted number reaches a set on number of a specific power rail, the corresponding power rail is turned on to convert the input voltage to an output voltage; and counting a number of the clock off pulses, when the counted number reaches a set off number of a specific power rail, the corresponding power rail is turned off.

In one embodiment of the present invention, the method further comprises: monitoring a status of the clock pin, and pausing the power on sequence and/or the power off sequence if the clock pin is pulled low. In one embodiment of the present invention, if any one PMIC does not receive a control signal at the enable pin or the input voltage of any one PMIC does not reach the under voltage threshold, the corresponding PMIC would pull low the clock pin CLK.

In one embodiment of the present invention, the method further comprises: stopping generating the power on sequence when the number of the clock on pulses reaches a total on number; and stopping generating the power off sequence when the number of the clock off pulses reaches a total off number.

In one embodiment of the present invention, if the enable pin is pulled low for a first set time period during a power on process, the power on sequence is terminated, and all of the enabled power rails are turned off at the same time. In one embodiment of the present invention, if the enable pin is pulled high for a second set time period during a power off process, the power off sequence is terminated, and all of the disabled power rails are turned on at the same time. That is, the method further comprises: if the enable pin is pulled low for a first set time period during the power on process, terminating the power on sequence and turning off enabled power rails at the same time; and if the enable pin is pulled high for a second set time period during the power off process, terminating the power off sequence and turning on disabled power rails at the same time.

In one embodiment of the present invention, the master PMIC has a higher rising voltage threshold than the slave PMIC, and the master PMIC has a lower falling voltage threshold than the slave PMIC.

Several embodiments of the foregoing power supply provide flexible control to the power manage systems compared to conventional technique. Unlike the conventional technique, several embodiments of the foregoing power supply employ power on and/or power off sequence to synchronize all the PMIC rails, thus greatly simplifying the IC design and the system architecture.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed is:

1. A power supply, comprising:
a master PMIC and n slave PMICs, wherein n is an integer equal to or greater than one, each of the master PMIC and the slave PMIC including:
at least one power rail, configured to generate an output voltage based on an input voltage;
an enable pin, configured to receive a control signal; and
a clock pin, wherein the enable pins of all of the PMICs are coupled together, and the clock pins of all of the PMICs are coupled together, and
wherein the master PMIC further comprises: a clock generator, configured to generate a series of clock pulses during a power on process when the input voltage reaches an under voltage threshold and a master enable voltage indicative of a voltage at the enable pin reaches a master rising voltage threshold, and configured to generate the clock pulses during a power off process when the master enable voltage falls to a master falling voltage threshold.

2. The power supply of claim 1, wherein the slave PMIC further comprises:
a clock processor, configured to count a number of the clock pulses during the power on process and during the power off process, and to pull low the clock pin of the corresponding slave PMIC if one of the power rails in the corresponding slave PMIC is being turned on and/or being turned off.

3. The power supply of claim 1, wherein:
when a number of the clock pulses generated by the master PMIC reaches a total on number during the power on process, the master PMIC is configured to stop the clock pulses output; and
when the number of the clock pulses generated by the master PMIC reaches a total off number during the power off process, the master PMIC is configured to stop the clock pulses output.

4. The power supply of claim 1, wherein each of the master PMIC and the slave PMIC further comprises:
a pull-low circuit, wherein the enable pin is configured to be pulled low by way of the pull-low circuit when the input voltage falls to an under voltage threshold.

5. The power supply of claim 1, wherein the master PMIC is configured to pull low the enable pin in response to an OFF command or a fault condition detection.

6. A method used in a power supply, the power supply comprising a master PMIC and n slave PMICs, wherein n is an integer equal to or greater than one, each PMIC rail being configured to receive an input voltage, and each PMIC including at least a power rail, an enable pin and a clock pin, the method comprising:
coupling the enable pins of all of the PMICs together, and coupling the clock pins of all the PMICs together;
comparing voltages at all of the enable pins with a rising voltage threshold and a falling voltage threshold, and comparing input voltages of all of the PMICs with an under voltage threshold;
generating a series of clock on pulses to start a power on sequence when a) the voltages at all of the enable pins reach the rising voltage threshold and b) the input voltages of all of the PMICs are higher than the under voltage threshold; and
generate a series of clock off pulses to start a power off sequence when the voltages at all of the enable pins fall to the falling voltage threshold.

7. The method of claim 6, further comprising:
counting a number of the clock on pulses, when a counted number the clock on pulses reaches a set on number of a specific power rail, the corresponding power rail is turned on to convert the input voltage to an output voltage; and
counting a number of the clock off pulses, when a counted number the clock off pulses reaches a set off number of a specific power rail, the corresponding power rail is turned off.

8. The method of claim 6, further comprising:
monitoring a status of the clock pin, and pausing the power on sequence and/or the power off sequence if the clock pin is pulled low.

9. The method of claim 6, further comprising:
stopping generating the power on sequence when a number of the clock on pulses reaches a total on number; and
stopping generating the power off sequence when a number of the clock off pulses reaches a total off number.

10. The method of claim 6, further comprising:
if the enable pin is pulled low for a first set time period during a power on process, terminating the power on sequence and turning off enabled power rails at the same time; and
if the enable pin is pulled high for a second set time period during a power off process, terminating the power off sequence and turning on disabled power rails at the same time.

* * * * *